US007810953B2

(12) United States Patent
Hsu

(10) Patent No.: US 7,810,953 B2
(45) Date of Patent: Oct. 12, 2010

(54) ILLUMINATING DEVICE

(75) Inventor: Hung-Kuang Hsu, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 114 days.

(21) Appl. No.: 12/202,576

(22) Filed: Sep. 2, 2008

(65) Prior Publication Data

US 2009/0180289 A1 Jul. 16, 2009

(30) Foreign Application Priority Data

Jan. 16, 2008 (CN) ........................ 2008 1 0300115

(51) Int. Cl.
*F21V 29/00* (2006.01)
*B60Q 1/06* (2006.01)

(52) U.S. Cl. ........................ 362/264; 362/218; 362/294; 362/373

(58) Field of Classification Search ................. 362/547, 362/218, 264, 294, 345, 373
See application file for complete search history.

(56) References Cited

U.S. PATENT DOCUMENTS

| | | | | |
|---|---|---|---|---|
| 7,344,296 | B2 * | 3/2008 | Matsui et al. | 362/652 |
| 7,488,093 | B1 * | 2/2009 | Huang et al. | 362/294 |
| 7,492,599 | B1 * | 2/2009 | Yu et al. | 361/719 |
| 7,547,123 | B2 * | 6/2009 | Kittredge et al. | 362/373 |
| 7,635,205 | B2 * | 12/2009 | Yu et al. | 362/294 |
| 7,637,634 | B2 * | 12/2009 | Chu | 362/294 |
| 7,654,703 | B2 * | 2/2010 | Kan et al. | 362/362 |
| 2008/0080196 | A1 * | 4/2008 | Ruud et al. | 362/373 |
| 2008/0285265 | A1 * | 11/2008 | Boissevain | 362/218 |
| 2009/0086490 | A1 * | 4/2009 | Kinnune et al. | 362/267 |
| 2009/0135613 | A1 * | 5/2009 | Peng | 362/373 |

* cited by examiner

*Primary Examiner*—Jacob Y Choi
(74) *Attorney, Agent, or Firm*—Andrew C. Cheng

(57) ABSTRACT

An illuminating device includes a light source module and a power supply module. The light source module includes a substrate, at least one solid state light emitting element, and a plurality of first heat-conducting fins. The substrate has a first surface and an opposite second surface. The at least one solid state light emitting element is arranged on the first surface. The first heat-conducting fins are formed on the second surface. The power supply module includes a housing with a slot formed therein. The housing includes a heat-conducting bottom plate and a plurality of second heat-conducting fins formed on the heat-conducting bottom plate. The light source module is detachably inserted in the slot with the first heat-conducting fins interleaved with the second heat-conducting fins and in thermal contact with the heat-conducting bottom.

14 Claims, 4 Drawing Sheets

ILLUMINATING DEVICE

BACKGROUND

1. Technical Field

The present invention relates to illuminating devices, and particularly, to an illuminating device with a solid state light emitting element.

2. Description of Related Art

Solid state light emitting elements, such as light emitting diodes (LEDs) have been widely used in illuminating devices.

An LED is capable of producing a visible light in a certain wavelength. However, 80% to 90% energy of the LED has been converted into heat, and only the rest is converted into the light.

Referring to FIG. 4, a typical illuminating device 10 is shown. The illuminating device 10 includes a housing 11 with a cover 13, and a light source module 12 arranged within the housing 11. The light source module 12 includes a substrate 121, a plurality of metallic circuits 122 and a plurality of LEDs 123. The metallic circuits 122 and LEDs 123 are arranged on the substrate 121. However, the heat produced by the LEDs 123 can not be got out, and thus, the LEDs 123 may become overheated.

What is needed, therefore, is an illuminating device which overcomes the above-mentioned problem.

SUMMARY

An illuminating device includes a light source module and a power supply module. The light source module includes a substrate, at least one solid state light emitting element, and a plurality of first heat-conducting fins. The substrate has a first surface and an opposite second surface. The at least one solid state light emitting element is arranged on the first surface. The first heat-conducting fins are formed on the second surface. The power supply module includes a housing with a slot formed therein. The housing includes a heat-conducting bottom plate and a plurality of second heat-conducting fins formed on the heat-conducting bottom plate. The light source module is detachably inserted in the slot with the first heat-conducting fins interleaved with the second heat-conducting fins and in thermal contact with the heat-conducting bottom plate.

Other advantages and novel features of the present illuminating device will become more apparent from the following detailed description of embodiment when taken in conjunction with the accompanying drawings.

BRIEF DESCRIPTION OF THE DRAWINGS

Many aspects of the illuminating device can be better understood with reference to the following drawings. The components in the drawings are not necessarily drawn to scale, the emphasis instead being placed upon clearly illustrating the principles of the present illuminating device. Moreover, in the drawings, like reference numerals designate corresponding parts throughout the several views.

DETAILED DESCRIPTION OF THE EMBODIMENT

Embodiment of the present illuminating device will now be described in detail below and with reference to the drawings.

Figure 1:
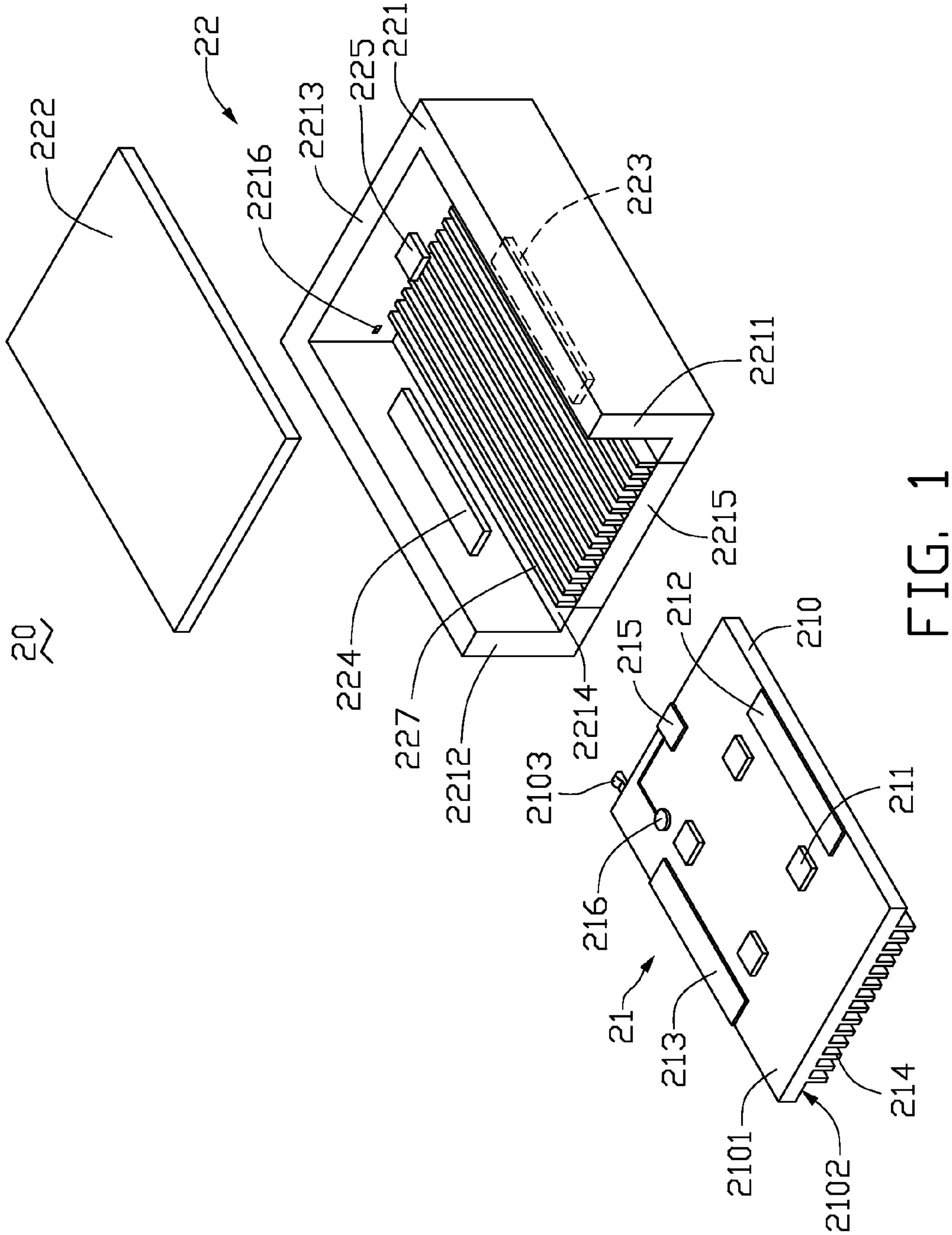
FIG. 1 is a disassembled view of an illuminating device in accordance with an embodiment of present invention.
Figure 2:
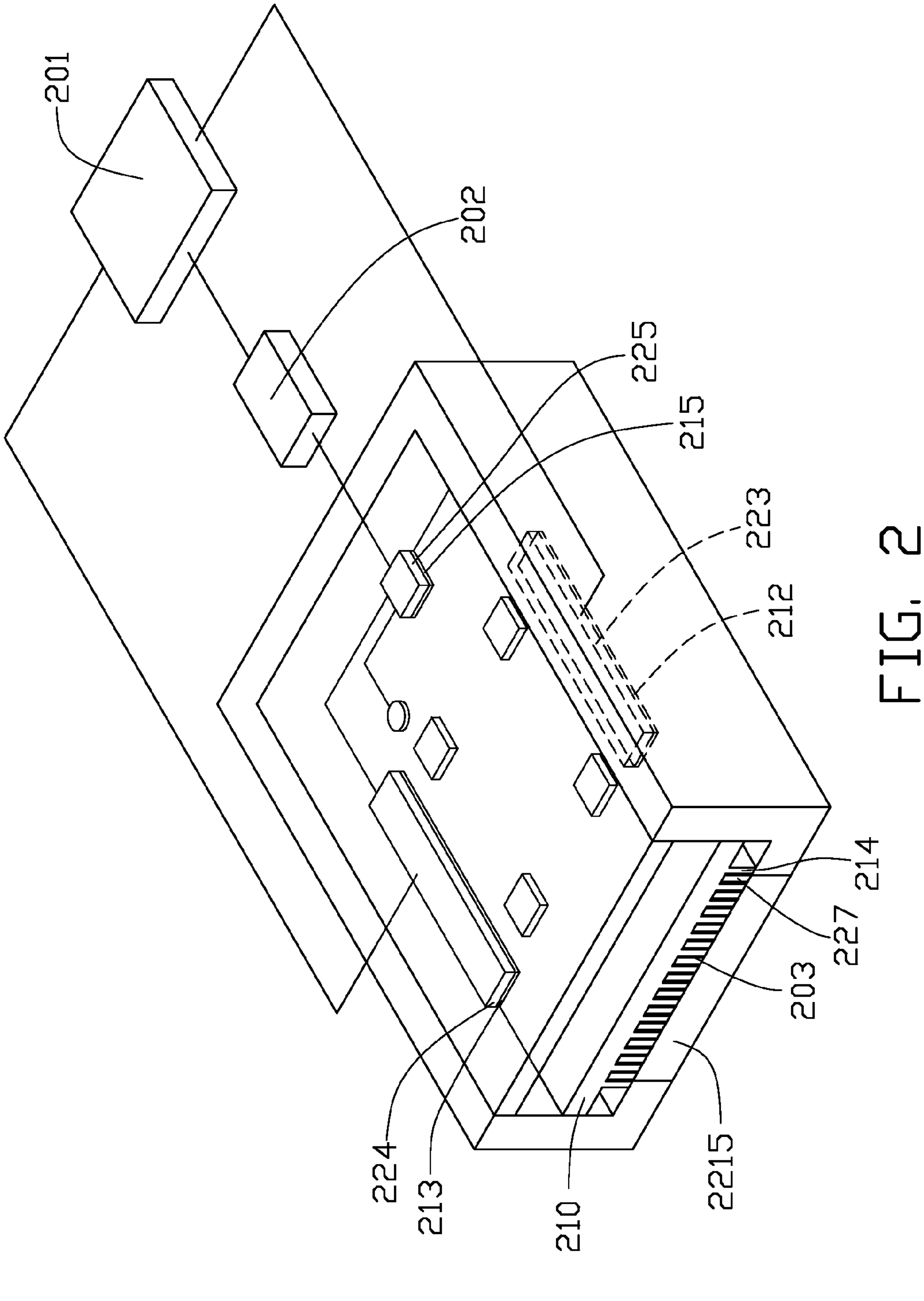
FIG. 2 is an assembled view of the illuminating device shown in FIG. 1.

Referring to FIGS. 1 and 2, an illuminating device 20 is provided. The illuminating device 20 includes a light source module 21 and a power supply module 22.

The light source module 21 includes a substrate 210, a plurality of solid state light emitting elements 211, a first electrode terminal 212, a second electrode terminal 213, and a plurality of first heat-conducting fins 214.

The substrate 210 is rectangular, and has a first surface 2101 and an opposite second surface 2102. The substrate 210 has an anchor 2103 formed on a side surface thereof. The substrate 210 is made of a thermally conductive metallic material, such as copper, or aluminum.

The solid state light emitting elements 211, first electrode terminal 212, and second electrode terminal 213 are arranged on the first surface 2101 of the substrate 210. Each of the first electrode terminal 212 and second electrode terminal 213 is an elongated metal strip. The solid state light emitting elements 211 are electrically connected to the first electrode terminal 212 and the second electrode terminal 213. Each of the solid state light emitting elements 211 is an LED.

The first heat-conducting fins 214 are formed on the second surface 2102 of the substrate 210. The first heat-conducting fins 214 are made of a thermal conductive material. The first heat-conducting fins 214 each are rectangular.

A sensor 216 and a first signal terminal 215 are also arranged on the first surface 2101 of the substrate 210. The sensor 216 is configured for detecting brightness and color of light emitted by the solid state light emitting elements 211. In this way, decay of the solid state light emitting elements 211 can be detected. The first signal terminal 215 is configured for transmitting signals from the sensor 216.

The power supply module 22 includes a housing 221 with a slot 2214 formed therein and a transparent top plate 222 detachably coupled thereon, a first power terminal 223, a second power terminal 224, and a second signal terminal 225.

The housing 221 is mainly cuboid shaped. The slot 2214 is defined on a sidewall thereof. The housing 221 has other three sidewalls 2211, 2212 and 2213. The transparent top plate 222 is a planar lens. The first power terminal 223, the second power terminal 224, and the second signal terminal 225 are formed on the respective inner surfaces of the sidewalls 2211, 2212 and 2213 of the housing 221. Furthermore, a hole 2216 is also defined on the inner surface of the sidewall 2213 of the housing 221. The housing 221 further includes a heat-conducting bottom plate 2215 and a plurality of second heat-conducting fins 227 formed on the heat-conducting bottom plate 2215. The second heat-conducting fins 227 are similar in shape to the first heat-conducting fins 214. The heat-conducting bottom plate 2215 and the second heat-conducting fins 227 can be integrally formed into a unitary piece from a thermally conductive material.

The first power terminal 223 and the second power terminal 224 are electrically connected to a power supply 201. The second signal terminal 225 is electrically connected to the power supply 201 via a controller 202. The power supply 201 and the controller 202 can be arranged outside of the housing 221.

The light source module 21 can be detachably inserted in the slot 2214 of the housing 221. The anchor 2103 of the substrate 210 is received in the hole 2216 of the housing 221. The first electrode terminal 212 and second electrode terminal 213 each are electrically coupled to the first power terminal 223 and the second power terminal 224, respectively. The first signal terminal 215 is electrically coupled to the second signal terminal 225. The first heat-conducting fins 214 are interleaved with the second heat-conducting fins 227, and in thermal contact with the heat-conducting bottom plate 2215. A thermal grease 203 can be applied at an interface between the neighboring first and second heat-conducting fins 214, 227, and at an interface between the first heat-conducting fins 214 and the heat-conducting bottom plate 2215. In this way, heat generated by the solid state light emitting elements 211 can be conducted to outside via the substrate 210, the first and second heat-conducting fins 214, 227, and the heat-conducting bottom plate 2215.

The controller 202 can generate a control signal for the power supply 201 based on the signals from the sensor 216. In this way, the power supply 201 can provide a desired driving current for the respective solid state light emitting elements 211.

Figure 3:
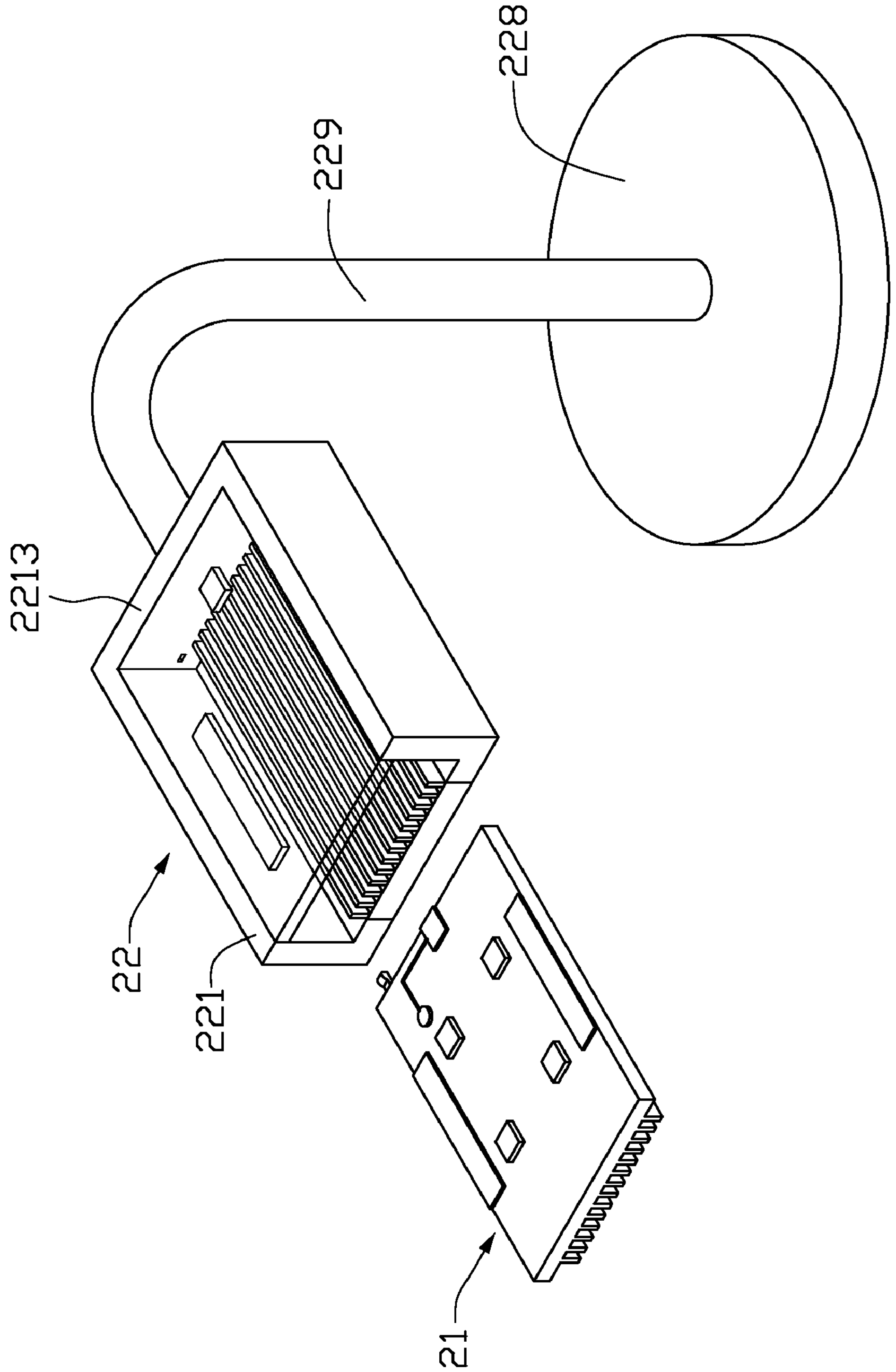
FIG. 3 shows an application of the illuminating device shown in FIG. 2.
Figure 4:
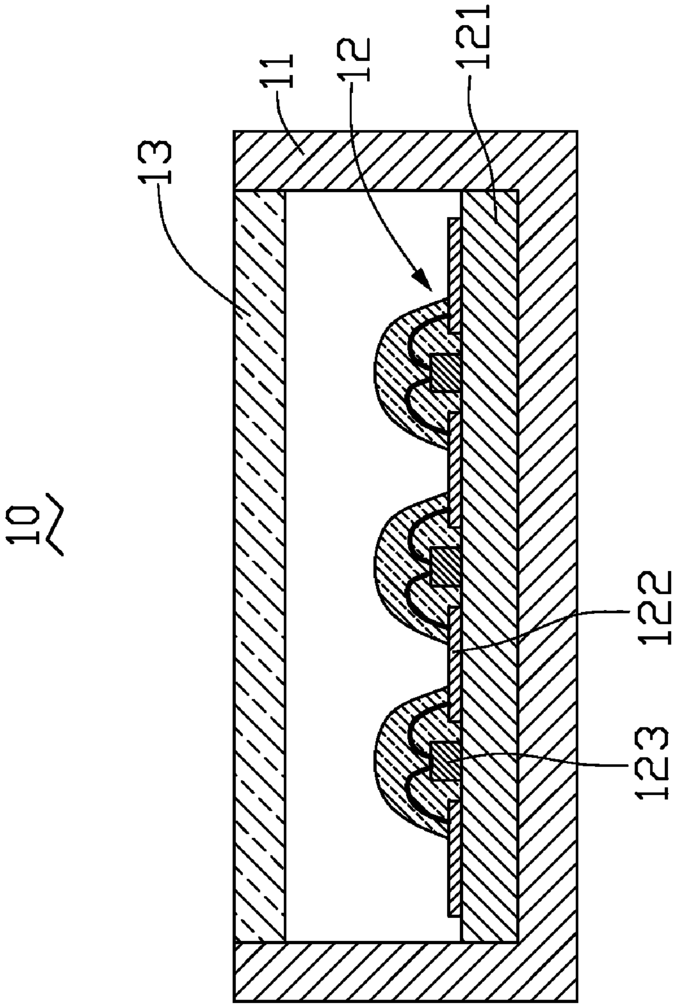
FIG. 4 (RELATED ART)
FIG. 4 is a schematic view of a conventional illuminating device.

Referring to FIG. 3, in use, the power supply module 22 can be arranged on an end of a pole 229, and another end of the pole 229 can be attached on a base 228. The pole 229 is preferably deformable, and is preferably attached on the sidewall 2213 of the housing 221.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An illuminating device, comprising:

a light source module comprising a substrate having a first surface and an opposite second surface, at least one solid state light emitting element arranged on the first surface, and a plurality of first heat-conducting fins formed on the second surface; and a power supply module comprising a housing with a slot formed therein, the housing comprising a heat-conducting bottom plate and a plurality of second heat-conducting fins formed on the heat-conducting bottom plate, the light source module detachably inserted in the slot with the first heat-conducting fins interleaved with the second heat-conducting fins and in thermal contact with the heat-conducting bottom plate.

2. The illuminating device of claim 1, wherein the light source module further comprises a plurality of electrode terminals formed on the first surface of the substrate; and the power supply module further comprises a plurality of power terminals formed on an inner wall of the housing, the at least one solid state light emitting element electrically connected to the electrode terminals, the electrode terminals electrically coupled to the power terminals.

3. The illuminating device of claim 2, wherein the power terminals are electrically connected to a power supply.

4. The illuminating device of claim 3, wherein the light source module further comprises a sensor arranged on the first surface of the substrate and configured for detecting a brightness and a color of light emitted from the at least one solid state light emitting element, and a first signal terminal arranged on the first surface of the substrate and connected to the sensor; and the power supply module further comprises a second signal terminal formed on an inner wall of the housing, the first signal terminal electrically coupled to the second signal terminal, the second signal terminal electrically connected to the power supply via a controller.

5. The illuminating device of claim 1, wherein the housing further comprises a transparent top plate, the light emitting element facing toward the transparent top plate.

6. The illuminating device of claim 5, wherein the transparent top plate is a lens.

7. The illuminating device of claim 1, wherein the substrate has an anchor formed thereon; and the housing has a hole defined in an inner wall thereof, the anchor being received in the hole.

8. The illuminating device of claim 1, wherein the substrate is made of a thermally conductive material.

9. The illuminating device of claim 1, wherein the second heat-conducting fins and the heat-conducting bottom plate are integrally formed into a unitary piece.

10. The illuminating device of claim 1, wherein a thermal grease is applied at an interface between the neighboring first and second heat-conducting fins.

11. The illuminating device of claim 1, wherein a thermal grease is applied at an interface between the first heat-conducting fins and the heat-conducting bottom.

12. The illuminating device of claim 1, wherein the power supply module further comprises a base, and a pole having a first end attached on the base and a second end attached on the housing.

13. The illuminating device of claim 12, wherein the pole is deformable.

14. An illuminating device, comprising:

a light source module comprising a metallic substrate having a first surface and an opposite second surface, a plurality of light emitting diodes mounted on the first surface, and a plurality of first heat-conducting fins formed on the second surface; and a power supply module comprising a housing with a slot formed therein, the housing comprising a heat-conducting bottom plate and an opposite transparent top plate and a plurality of second heat-conducting fins formed on the heat-conducting bottom plate, the light source module detachably inserted in the slot with the first heat-conducting fins interleaved with the second heat-conducting fins and in thermal contact with the heat-conducting bottom plate, and the light emitting diodes facing toward the transparent top plate, the housing having an electric contact for electrically coupling to the light emitting diodes.

* * * * *